Feb. 18, 1936.    W. B. CLIFFORD    2,031,558
RELIEF VALVE FOR HOT WATER SYSTEMS
Original Filed March 2, 1929
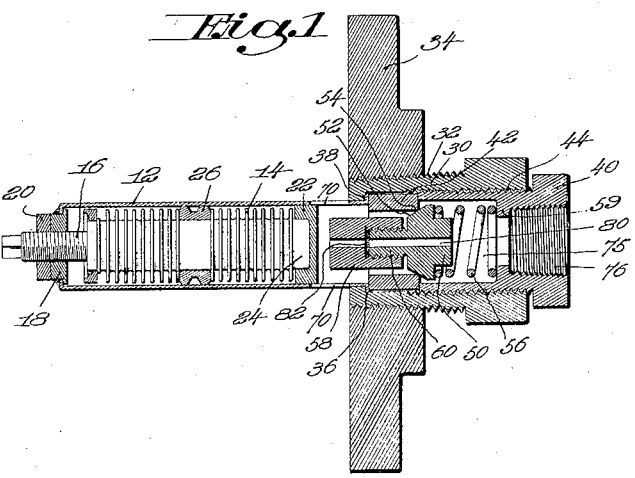
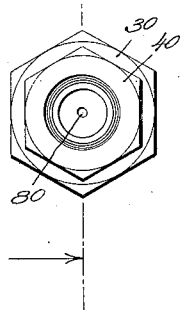
Witness
Frederick S. Greenleaf.
Inventor
Walter B. Clifford
by his attorneys Patented Feb. 18, 1936

2,031,558

UNITED STATES PATENT OFFICE 2,031,558

RELIEF VALVE FOR HOT WATER SYSTEMS

Walter B. Clifford, Boston, Mass., assignor to Clifford Manufacturing Co., Boston, Mass., a corporation of Delaware Application March 2, 1929, Serial No. 344,062
Renewed July 11, 1933

2 Claims. (Cl. 137—53)

The present invention relates to apparatus intended particularly for attachment to domestic hot water systems.

Hot water systems as commonly used for domestic purposes comprise a tank in communication with the water service, and heated generally by gas, although frequently such tanks are heated by coal or oil. In a common type of gas heating apparatus for this purpose, control of the gas heater is accomplished thermostatically in accordance with the temperature of the water in the tank. Independently of the automatic control, however, systems of this character are universally supplied with a safety device to prevent the development of excessive pressure within the tank and consequent bursting. It is common practice to attach, either directly to the tank or to a fitting connected therewith, a pressure relief valve which operates to vent water from the tank upon the devolpment of excessive pressures. It is also common, at least in certain localities, to provide a fusible plug or similar device which will melt and vent water from the tank upon the creation of excessive temperatures. Due to the development of gas heating for this type of tank, which serves to quickly elevate the temperature to any desired point and frequently to temperatures well above the boiling point of the water, a device which vents water from the tank upon the occurrence of unduly high temperatures is essential. The fusible plug employed for this purpose has many disadvantages, first because it is difficult to make such plugs uniform, in other words, cause them to vent at a constant temperature, and secondly, after fracture the water continues to be emptied from the tank until the plug is replaced.

The purpose and object of the present invention is to provide a relatively simple and efficient relief valve operating primarily on temperature, and serving to vent water from the tank only so long as the temperature continues in excess of a predetermined limit, the valve thereafter closing to shut off further escape of water.

With this and other objects in view, the various features of the invention consist in certain novel features of construction, combinations and arrangements of parts hereinafter described and claimed, the advantages of which will be obvious to those skilled in the art from the following description.

In the accompanying drawing illustrating the preferred form of the invention, Fig. 1 represents a section in elevation of the improved valve; and Fig. 2 is a top plan view of the valve shown in Fig. 1.

The device shown in the illustrated embodiment of the invention comprises essentially a tubular casing 12, preferably of thin wall construction such as brass or copper, to readily transmit heat from the surrounding water. Enclosed within the casing is a bellows thermostat 14, having an outside diameter approximating one-half inch. This bellows thermostat is provided from a corrugated tube, as will be familiar to those skilled in the art, and expands and contracts with changes in temperature. One end of the thermostat is fixed by connection of a threaded stud 16 with a head 18 secured in the end of the tube 12, the threaded stud being locked in place by a nut 20. The opposite free end is provided with a head 22, fitting upon the closed end 24 of the tube from which the bellows is formed, as indicated clearly in the drawing. The head 22 slides within the tube 12 and acts both as a guide for the free end of the thermostat and as an operating instrumentality for moving the valve. Located intermediate the fixed and free ends of the thermostat is a collar 26 surrounding the tube and formed thereon during the formation of the bellows, this collar fitting within the tube 12 and serving as an intermediate guide to prevent chafing of the bellows folds within the tube 12. The bellows is filled interiorly with a suitable liquid which expands and contracts under the influence of heat, Nujol having been employed for this purpose. After completely filling the bellows with liquid, it is hermetically sealed.

The guide tube 12 at the inner end is connected into a threaded plug 30, which in turn is adapted, through an external pipe thread 32, to be connected into a spud 34 formed in the side of the tank, or into a plug in the hot water line communicating with the tank and adjacent thereto. As indicated more particularly in Fig. 1, the connection between the guide tube 12 and the plug 30 is accomplished by flanging the end of the guide tube outwardly at 36, this flange being received against a shoulder 38 formed on the interior of the plug and rigidly clamped in place by an inner plug 40, which engages directly with a ring or collar 42, this collar in turn engaging with the flange 36 on the end of the tube. The inner plug 40 is threaded to the outer plug 30 at 44.

Loosely received in the chamber formed by the inner plug, the ring 42 and the guide tube, is a valve member 50 having a tapered portion 52 which engages with a seat 54 formed on the ring 42. This valve is normally retained in closed position on the seat by a spring 56 interposed between the valve and a shoulder 59 formed interiorly of the plug 40. The end of the valve adjacent the operating bellows is provided with a guide member 58, which is threaded to a reduced end 60 of the valve and projects into the tube 12 in a manner to contact with the fitting 22 on the end of the bellows when the operating temperature is reached.

In actual practice the hot water circulating freely about the thin wall tubing 12 causes the bellows and surrounding space to assume the temperature thereof. If and when the temperature of this water exceeds predetermined limits, which, generally speaking, may be 230° F. if the device is located at the upper portion of the tank or in a fitting between the gas heater and the upper portion of the tank, the bellows expands to such an extent that contact is made between the fitting 22 and the end 58, causing the valve 50 to be removed from its seat against the pressure of the spring and vent water. Upon lifting of the valve from its seat water vents freely from the system through openings 70 of ample size formed in the guide tube adjacent its connection to the plug, water thereafter passing through the annular space within the valve ring 42 outwardly through the chamber 75 in the plug 40, and thence into a discharge pipe connected into the threaded opening 76 of the plug 40. Hot water continues to vent in this manner so long as the temperature remains above the predetermined limit. When sufficient cold water has been drawn into the system due to this venting to lower the temperature about the valve, the bellows contracts, allowing the valve to be returned to its seat by the spring. Thereafter, if the heat remains on and the temperature again becomes excessive, the operation will be repeated, and will continue intermittently until the heat is reduced.

In addition to serving as a temperature relief, the present construction also serves as a pressure relief, the spring 56 being sufficiently heavy to retain the valve on its seat at normal pressures encountered. When excessive pressures are reached, for example, on the order of 125# per square inch, the spring will be compressed by the pressure behind the valve, opening the valve to vent water independently of the position of the bellows.

As a further safeguard, should failure of the bellows occur, the interior of the valve 50 with the connected member 58 is provided with an aligned passage 80, normally closed by a fusible plug 82 clamped between the valve and the member 58. This plug is set to melt at a definitely higher temperature than that ordinarily necessary to open the valve, and therefore only operates in case of failure of the bellows and attainment of temperatures substantially in excess of those at which the bellows normally operates. If rupture of the plug occurs, it may be replaced by removal of the plug 40 with the valve assembly 50, and thereafter disconnecting the valve 50 and the plug 58 to permit the insertion of a new fusible plug.

It will be recalled that the bellows thermostat is filled with liquid, and that expansion of the thermostat occurs by virtue of liquid expansion rather than vapor pressure. Because this liquid expansion produces a positive movement of unlimited power, the bellows can readily operate to open the valve independently of the strength of the closing spring 56. Adjustment of the temperature at which the valve is opened by expansion of the bellows may be secured by varying the position of the bellows unit within the tube through adjustment of the threaded stud 16 within the head 18, the unit being locked in any adjusted position by the nut 20.

As will be evident, this type of unit has the very definite advantage that it offers a safeguard both from the standpoint of pressure and temperature, and in the event that excessive temperatures are reached, the venting of the water continues only so long as these temperatures continue, the valve thereafter being automatically restored and ready for further service. In other words, in ordinary practice the safety function of the valve continues indefinitely, without necessity for replacement of parts or servicing. Furthermore, owing to its characteristic construction, the valve is exceedingly sensitive to rapid changes in temperature due to the use of the thin wall tubing with the bellows thermostat in close relationship thereto, so that if the temperature of the water is being rapidly elevated, there is no substantial lag in operation of the valve which will permit the water to assume dangerous temperatures before operation of the valve occurs.

What is claimed is:

1. A relief valve for hot water systems comprising a threaded plug, a tubular sleeve connected with the plug at its inner end, a separate valve ring within the plug, an inner member clamping the tubular sleeve and the valve ring within the plug, a valve loosely received within the ring and co-operating therewith, and a bellows thermostat supported within the tubular sleeve and operating to open the valve on attainment of predetermined temperatures.

2. A relief valve for hot water systems comprising a cylindrical casing member, a removable guide tube, a removable valve seat assembled within the casing member, a clamping plug threadedly connected to the casing member and clamping the valve seat and guide tube in assembled relation, the interior of the casing being provided with a bore of sufficient size to permit withdrawal therefrom of the valve seat and guide tube upon removal of the clamping member, a valve cooperating with the seat, and a bellows thermostat mounted in the guide tube and tending to remove the valve from its seat upon expansion.

WALTER B. CLIFFORD.